Patented July 23, 1940

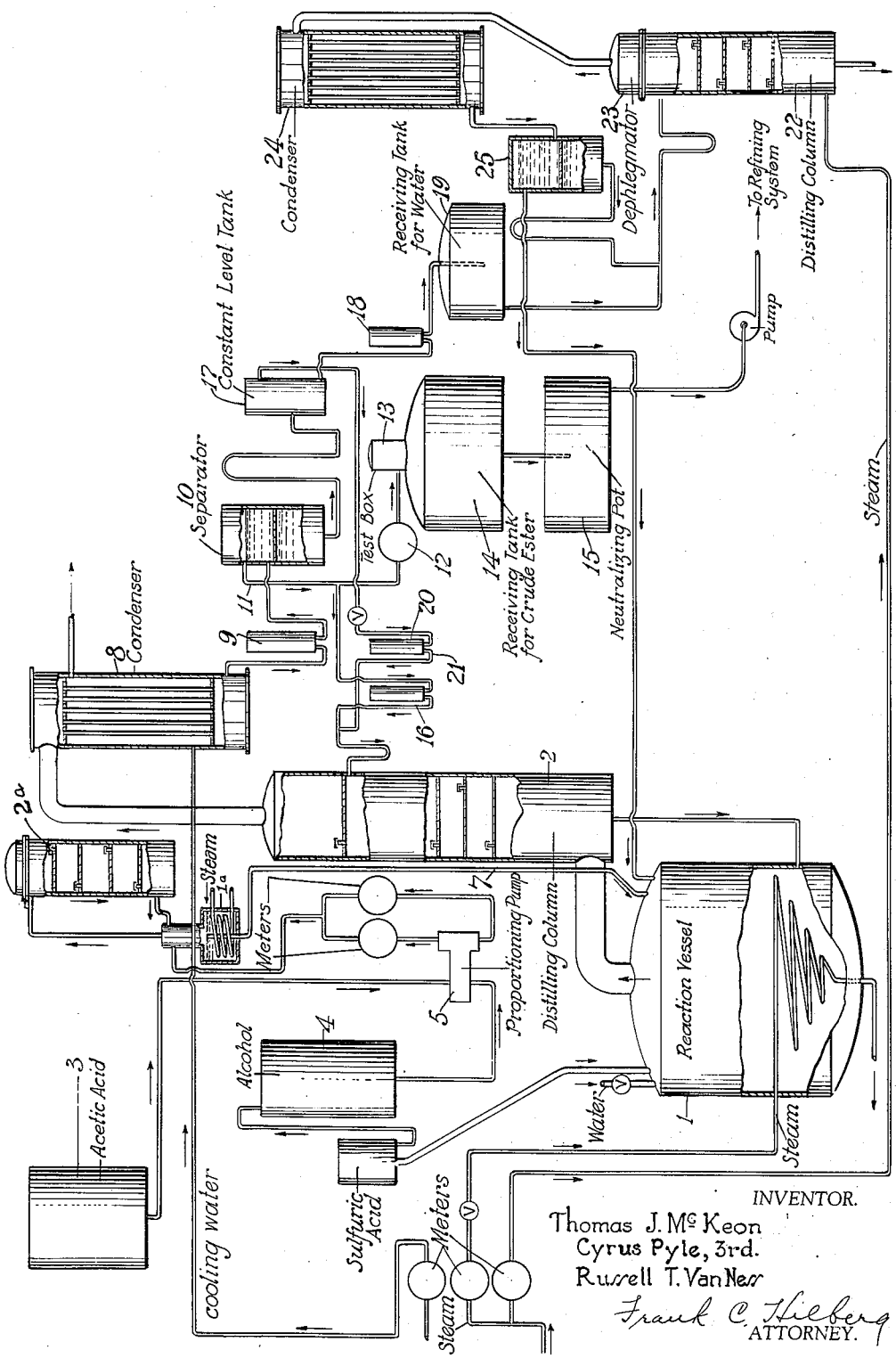

2,208,769

UNITED STATES PATENT OFFICE 2,208,769

PROCESS FOR CONTINUOUS ESTERIFICATION

Thomas J. McKeon, Cyrus Pyle, 3rd, and Russell T. Van Ness, Parlin, N. J., assignors to E. I. du Pont de Nemours & Company, Wilmington, Del., a corporation of Delaware Application November 15, 1935, Serial No. 49,932

3 Claims. (Cl. 260—488)

This invention relates to an improved process for esterification and more particularly to a process for the continuous production of organic esters of the aliphatic alcohols and aliphatic acids, including butyric.

Esterification reactions are based on a chemical combination of an alcohol and an organic acid, resulting in the formation of an ester and water. Such a reaction is reversible. The formation of ester and water proceeds at a decreasing rate, while the products formed begin to react at an increasing rate, reforming alcohol and acid. This action proceeds to a point known as equilibrium, where the speed of both reactions is the same and there is no further quantitative change of the materials involved. Therefore, in order to have the reaction progress, it is necessary to shift this equilibrium to favor the formation of the ester and this is done in general practice by the removal of the ester and water from the sphere of reaction.

Present manufacturing operations make use of the so-called "batch" process. This method consists chiefly in charging into a still kettle, a predetermined quantity of acid, alcohol and catalyst. A slight excess of alcohol is usually added to compensate for any losses, resulting from solubility in water. The charge is refluxed for a short period and the distillate then passed through a separator to remove the water, the ester layer being returned to the still kettle. This is continued until all of the water has been removed. Finally the unconverted acid and the catalyst, which is usually an acid, are neutralized and the charge is then ready for distillation.

The principal disadvantages of this process are low production rate, non-uniformity in product and high losses.

A semi-continuous process, later developed, avoids some of the deficiencies of the batch process. As in the case of the batch process, an excess acid, alcohol and catalyst are charged into the still kettle. After a refluxing cycle, the distillate is carried off through a separator, where stratification takes place, providing an ester and a water layer as in the batch process. At this point, however, the semi-continuous process deviates, in that the ester layer is not returned to the reaction zone, but is dropped by gravity to a storage tank. The water layer is likewise dropped by gravity to a receiver to be later rectified to recover ester, alcohol and acid which may have been carried over with it.

After the removal of a portion of the reaction products, additional alcohol is fed into the kettle at a rate prescribed by operating conditions. During this cycle the acid concentration gradually drops to a point where esters of acceptable ester value cannot be produced. Generally, however, addition of alcohol is continued, forming a product of low ester value. This product then is used in the initial charge of subsequent runs.

The semi-continuous process has certain advantages over the batch process in that production is increased and a more uniform quality ester is produced. Better yields and lower operating costs are likewise afforded.

The chief disadvantage of this process is the non-producing time involved, resulting in the high power consumption required in heating the charge and for exhausting the weak ester alcohol mixture. In addition the charge is easily thrown off balance because of inadequate control and this results in high acidity, or low ester value of the finished product.

The present invention provides a process for the esterfication of higher alcohols wherein the several deficiencies of the batch and semi-continuous methods are avoided.

This invention has as an object the provision of a process for the continuous production of esters of higher alcohols. A further object is to provide a process for the esterification of higher alcohols whereby substantial operating economies are secured in that production is materially increased, and at the same time permitting a reduction in the amount of equipment necessary for the final purification. A still further object of the invention is the provision of an esterification process which can be easily controlled so as to yield a product of high ester value of uniform quality such that necessity for final fractionation is eliminated.

These objects are accomplished by the use of suitable equipment and procedures described hereinafter, whereby definite and substantial improvements over prior processes are afforded by continuously esterifying higher alcohols to produce corresponding esters.

The attached drawing shows diagrammatically the equipment and scheme of the process, reference to which will be readily understood from the description of the process given hereafter.

The invention is illustrated by the following specific example for the esterification of normal butyl alcohol and acetic acid. Reference to the drawing will clearly indicate the various steps in the process; however, it will be understood that this example is only illustrative.

In this example, sulfuric acid is used as a catalyst to increase the speed of reaction of the acid and alcohol. Also, in order to obtain the greatest conversion of acid and alcohol to ester, an excess of acid of the order of 20 times the theoretical equivalent of the alcohol is employed. In adopting ratios of this order, it has been found that in operating the process as subsequently explained the production of a material of high ester value is assured. However, reaction mixtures which are too concentrated in acid are not desirable, since after the ester is formed it is necessary to separate it from the reaction mixture by means of a fractionating column and to keep the acid losses at a minimum in the distillate. To meet this contingency, the reaction mixture is diluted with water.

The following mixture is charged through pipes not shown into a 2200 gallon reaction vessel shown as 1 in the drawing.

| | Gallons |
|---|---|
| Acetic acid (100%) | 750 |
| N-butyl alcohol | 150 |
| Sulfuric acid (93%) | 30 |
| Water | 450 |
| | 1380 |

This charge is heated to a temperature of 100° to 105° C. by means of a steam coil located at the bottom of the kettle. The vapors of the products of reaction, ester and water, some acid and some alcohol rise through a 28-inch copper distilling column 2 consisting of 30 sieve plates. The pressure of the vapors at the base of the column is controlled at about 30-36″ of water by a steam regulator.

The alcohol-acid mixture is pumped into the kettle at the same rate as the products distill off so as to make the operation continuous. Acetic acid (90%) and N-butyl alcohol (99%) are drawn from storage tanks 3 and 4 by proportioning pump in fixed proportions and in such quantities as to yield 200-250 gallons per hour of 90% ester. This proportion is normally about:

| | Gallons |
|---|---|
| 90% acetic acid | 90 |
| N-butyl alcohol | 155 |

The mixture is pumped through a preheater 1a, where it attains a temperature of 90°C. Sulfuric acid to the extent of 0.1 to 0.3% of the mixture is previously added to the alcohol to facilitate esterification in the preheater, which amounts to about a 10% conversion of acid to ester.

From the preheater 1a, the hot mixture is refluxed and passed through column 2a which is packed with Raschig rings or plates, as shown, and it then runs into the reaction vessel 1, which contains the initial charge, as noted above. It is here that the balance of the esterification takes place. The vapors rise through the distilling column 2, and then into a tubular condenser 8 where they are condensed and cooled to less than 25° C.

The condensate from condenser 8 passes through a flow-meter 9 by which the quantity is measured and thence to a separator 10 where it stratifies into two layers, crude ester and water. Of the total condensate which boils at 90° to 92° C., the ester layer is roughly 90% and the water layer 10%. The composition of the two phases is about as follows:

| | Ester layer | Water layer |
|---|---|---|
| | Percent | Percent |
| Ester | 91.0 | 2.5 |
| Alcohol | 7.9 | 4.0 |
| Water | 1.0 | 93.0 |
| Acetic acid | 0.1 | 0.5 |
| | 100.0 | 100.0 |

The total condensate amounts to about 5000 pounds per hour.

The ester layer, being the lighter of the two, rises to the top of the separator 10, while the water settles to the bottom. The ester is drawn from the top at 11 and that portion which is removed to the receiving tank 14 is metered at 12 and then passes through a test box 13 where the amount removed is controlled. From the receiving tank, the ester is dropped by gravity to a neutralizing pot 15 where it is washed with a dilute solution (7%) of sodium hydroxide to remove traces of free acid and objectionable color formed during the esterification operation. This is followed by two fresh water washes to remove the sodium hydroxide from solution in the ester. After neutralization the ester is pumped to the refining system. A portion of the ester in quantities of such magnitude as to maintain a reflux ratio of 2 to 2½ in the column is drawn from the separator and passes through a flowmeter 16 onto the top plate of the distilling column 2, as reflux. The ester removed amounts to about 1500 pounds per hour while that refluxed amounts to about 3000 pounds per hour.

The water from the bottom of the separator passes to a small constant level tank 17 which functions to furnish a constant head for the take-off flowmeter 18. Water to the extent of 250 pounds per hour is removed to a receiving tank 19. This water is mostly that which is introduced into the vessel 1 with the acid used as feed, and that formed as a result of the esterification reaction, and must be removed to keep the composition of the mixture in the vessel 1 constant.

The remainder of the water, 250 pounds, may be taken from the top of the constant level tank through the flowmeter 20 and connecting line 21 to the top of the column 2 along with the crude ester, as reflux. This water has a washing action whereby any excess acid is removed from the vapors traveling up the distilling column.

The water containing some ester and alcohol which is collected in the receiving tank 19 is fed into a 12″ copper column dephlegmator 22, packed near the top with Raschig rings. Live steam is blown into the base of the column to heat the descending feed. The condensed steam, as well as the water separated from the feed, is exhausted from the bottom of the column as waste. The vapors rising to the top of the column pass through a dephlegmator 23 and to an ordinary tubular condenser 24 where they are condensed and cooled. The condensate passes to a separator 25, where stratification occurs, providing crude ester and water layers. The water is returned to the top of the column 22 as reflux and the crude ester is returned to the main esterification kettle 1. The condensate consists of approximately 65% ester, 8% water and 27% alcohol.

In the production of these esters, the condensate separates into two liquid phases which consist roughly of 90% crude ester and 10% water. The gravity of the two phases, as well as the percentage composition will vary slightly for different esters from the figures given in the example above.

An important feature of the process is the maintenance of a large excess of acid in the reaction vessel. This in conjunction with the other salient points of the method insures a product of high ester value and thereby avoids the need for additional fractionation. It is preferred to use about 20 times the quantity of acid theoretically required to esterify the alcohol present either at the start of the run or at any time during the operation of the process. A maximum of about 40 times the alcohol present may be set as the upper limit for this ratio.

Suitable modifications of equipment with regard to equivalents can be made without departing from the spirit of the invention and will be readily apparent to those skilled in the art. For example the location and position of the various parts of the equipment can be arranged to suit the available space. The preheater 6 shown in the drawing to be located at the top of the distilling column 2 where it is heated by the vapors passing thru the column to the condenser 8 may be placed outside the column and heated by auxiliary means.

The process of the invention is applicable to the esterification of higher alcohols of medium volatility, for example, isobutyl, "Pentasol," amyl, propyl, secondary butyl and secondary amyl alcohol. Esters of acids other than acetic, such as propionic and butyric acid may also be produced by the process of the invention. In general, the process is of particular utility in the large scale production of esters of the higher aliphatic alcohols of medium volatility.

The continuous process as practiced according to the foregoing description provides higher ratios of production with, of course, corresponding lowering in costs of the final product.

A high quality product is obtained through operation under conditions which are capable of accurate control and in practice the improved process provides material of high ester value without additional fractionation in auxiliary equipment.

The non-producing time characterizing the semi-continuous process occasioned by getting up to heat and for exhausting, is eliminated in the present method.

Considerably less equipment is required than in practices where complete installations were required for each step in the manufacture of a commercially acceptable product.

The process also assures greater uniformity as regards the quality and properties of the final ester.

Lower power consumption is afforded because of the fact that the process is continuous, thereby avoiding losses in heating the charge and for exhausting the weak ester alcohol mixture.

It is apparent that many widely different embodiments of this invention may be made without departing from the spirit and scope thereof; and, therefore, it is not intended to be limited except as indicated in the appended claims.

We claim:

1. Process of reacting the lower monocarboxylic aliphatic acids with aliphatic monohydric alcohols having from 3 to 5 carbon atoms which comprises heating a reaction mixture containing the same in which the acid is present in chemical equivalents of about 20 to 40 times the theoretical equivalent of the alcohol, subjecting the reaction mixture to a reflux action and supplying to the said mixture approximately equimolecular proportions of acid and alcohol which have undergone partial esterification at a rate substantially equal to that at which the vapors are withdrawn from the reaction zone.

2. A continuous process of preparing esters of the lower monocarboxylic aliphatic acids and aliphatic monohydric alcohols having from 3 to 5 carbon atoms which comprises distilling a reaction mixture in which the acid is present in amounts from 20 to 40 equivalents for each equivalent of alcohol and supplying to the said reaction mixture fresh alcohol and acid in approximately equimolecular proportions and at a rate equal to that at which the reaction products are withdrawn so that the volume of the reaction mixture and the equivalent ratio of acid to alcohol therein is kept constant, condensing the distilled vapors, collecting the cold reaction products and allowing the same to separate into two layers, returning a portion of the ester layer to the reaction vessel in counter-current relation to the reflux of the reaction products and in direct contact therewith.

3. A continuous process of preparing esters of the lower monocarboxylic aliphatic acids and aliphatic monohydric alcohols having from 3 to 5 carbon atoms, which comprises charging a reaction vessel with about 5 volumes of acid to 1 volume of alcohol together with sulphuric acid as a catalyst, heating the same until the ratio of the acid to alcohol is of the order of 20 to 40 equivalents of acid to 1 equivalent of alcohol, cooling the distilled vapors by passing them through a refluxing tower, passing fresh alcohol and acid in equivalent amounts with a small amount of sulphuric acid through the refluxing tower whereby about 10% conversion is obtained, passing the partially converted ingredients into the still wherein the esterification is continued, collecting the vapors from the still, cooling the same, stratifying, passing a portion of the ester to the top of a reflux column in amount sufficient to maintain a reflux ratio of 2 to 2½ in the column, and returning the water layer containing acetic acid as part of the feed to the reaction vessel in amount substantially equal to that at which acetic acid and water are distilled.

THOMAS J. McKEON.
CYRUS PYLE, 3RD.
RUSSELL T. VAN NESS.